United States Patent [19]

Chersin

[11] Patent Number: 5,172,804

[45] Date of Patent: Dec. 22, 1992

[54] PALLET BRIDGE DEVICE

[76] Inventor: Andrew J. Chersin, 848 W. Plantation Cir., Plantation, Fla. 33324

[21] Appl. No.: 744,124

[22] Filed: Aug. 9, 1991

[51] Int. Cl.$^5$ .............................................. B65G 41/00
[52] U.S. Cl. .................. 198/861.5; 198/861.3; 198/346.1; 198/592
[58] Field of Search ................. 198/592, 346.1, 861.3, 198/861.5, DIG. 950; 14/70, 71.3

[56] References Cited

U.S. PATENT DOCUMENTS

| 552,716 | 1/1896 | Matthiessen | 198/861.3 X |
| 2,425,860 | 8/1947 | Brady | 198/861.5 |
| 3,134,480 | 5/1964 | Loosli | 198/861.3 |
| 4,753,337 | 6/1988 | Grosjean | 198/950 X |
| 4,754,867 | 7/1988 | De Anda | 198/861.5 X |
| 4,899,869 | 2/1990 | Johnson | 198/861.5 X |
| 4,915,569 | 4/1990 | Cherko | 198/346.1 X |

FOREIGN PATENT DOCUMENTS

| 0076088 | 4/1919 | Fed. Rep. of Germany | 198/592 |
| 3419476 | 12/1984 | Fed. Rep. of Germany | 198/592 |
| 0136447 | 6/1987 | Japan | 198/861.5 |
| 0167041 | 4/1959 | Switzerland | 198/592 |

Primary Examiner—Robert P. Olszewski
Assistant Examiner—James R. Bidwell
Attorney, Agent, or Firm—Malin, Haley, McHale, DiMaggio & Crosby

[57] ABSTRACT

A bridge device spanning the distance between a set-up station and a machining center for transporting pallets between the two locations. The bridge is pivotedly coupled to the set-up station allowing the bridge to rotate between a horizontal operating position and vertical storage position. Placement of the bridge in a horizontal position allows pallets to slide across the bridge over rollers incorporated into guide tracks which form a part of the bridge. When the bridge is not in use the bridge is stored in a vertical position by lifting one end of the bridge. A hydraulic dampener allows ease of bridge movement between the operating and stored position. A collapsible support stand supports the bridge in the operating position and folds flush with the main frame of the bridge when placed into the storage position.

9 Claims, 2 Drawing Sheets

PALLET BRIDGE DEVICE

FIELD OF THE INVENTION

This invention relates generally to movement of machine workpiece pallets, and, more particularly, to a pallet bridge device used in combination with a remote pallet setup table.

BACKGROUND OF THE INVENTION

Manufacturers of precision components must produce parts fast and economically in order to survive in a competitive marketplace. To this extent, manufacturers rely upon automated technology such as robotics for welding, lasers for cutting, numerical controlled machine tools for crafting, and the like. These devices all possess the ability to perform a variety of functions accurately, quickly and with infinite repeatability. Numerical controlled machine tools, or CNC machines, exemplify this ability. Conventional CNC machines utilize a variety of tools of which any tool can be accessed quickly and placed within a thousandth of an inch of a preprogrammed placement point. This accuracy, coupled with its repeatability, allows a manufacturer to produce precision components quickly and economically.

Computers have made these precision machines possible by controlling the complexities of machining through a series of preprogrammed instructions. However, while computers significantly increase machining speed, accuracy and repeatability, machining set-up remains dependent upon human placement of the workpiece. Thus, accuracy is dependent upon proper placement of the workpiece within tolerances that meet or exceed the tolerance capability of the machine. Once a set of computer instructions or "program" is in place, it is essential that the component "workpiece" be placed within the coordinates of the preprogrammed instructions. This set-up must be done quickly and accurately for a machine that is not running defeats a primary purpose of a computer controlled machine.

The use of pallets have become an industry standard among manufacturers of precision machined components. A workpiece, or more likely multiple workpieces, are secured to a pallet external of the machine and slid onto a predetermined location when the machine is available. The use of a pallet simply allows the workpiece(s) of any shape to be attached thereto separate from the machine itself and the pallet provides a uniform means of securing itself to the machine. While a workpiece is being machined, another pallet can be prepared and slid into position upon demand. The pallet typically employs a critical datum point which is designed for alignment to the machine. Thus, if multiple workpieces are positioned upon a pallet, alignment of the pallet results in alignment of all items secured thereto. Once the pallet is aligned, machine operation can be started per its programmed instructions and the operator is free to set up another pallet.

While transfer of a pallet from a remote location may reduce the amount of time a machine is idle, the means used for transfer of the pallet creates an additional problem, namely, obstruction of the working area in front of the machine. For example, once a pallet is set-up at a remote location the pallet is transferred to the operating machine by fork lift, crane, or by a means allowing for the sliding of the pallet from a remote location to the machine's operating section. Typically the latter mode of transfer is utilized by placement of a span of metal bridging one location to another. This "bridge" is used to slide the pallet over any distance by use of rollers placed onto the bridge. However, due to the size and weight of pallets bridges must be large enough to provide stability as well as strong, the combination creating an obstacle in and of itself. For example, U.S. Pat. No. 4,915,569 issued Apr. 10, 1990 to Cherko illustrates a swivel frame type bridge which permits movement of pallets from a location separate to the machine directly onto the machine. While the Cherko device assists the operator in placement of pallets onto a machine, access is severely limited by the size of the device despite the use of an horizontal articulating mechanism.

While the use of a bridge greatly benefits an operator in the transport of heavy pallets, it should be obvious that any apparatus mounted directly in front of a machine severely limits access to the machine. Access is necessary for tool changing, service, pallet alignment, cleaning, oiling, adjusting, supervising, and so forth. These problems are further expounded upon by recent OSHA requirements that the sides of such machines be enclosed by a stationary shield which, when used in combination with a fixed bridge, nearly eliminates access by the operator to the operating area.

My invention is specifically designed to overcome the aforementioned problems by use of a movable bridge having all the inherent qualities found in a fixed bridge. Therefore, it is the effective resolution of these problems that the present invention is directed.

SUMMARY OF THE INVENTION

With the foregoing in mind, the principle object of the present invention is to provide a simple and reliable device or apparatus which overcomes the difficulties previously mentioned when transferring pallets from one location to another.

The instant invention is an improved bridge used in the conventional manner for pallet transfer, the improvement comprising a novel means of removing the bridge from the machine locale by raising one end of the bridge to a location permitting complete access to the operating center. By use of such a device, the size of the bridge is not limited in width or required to carry pallets longitudinally as the bridge of the instant invention folds upright against the remote set-up area allowing full access to the operating machine. Bridge legs fold flat against the bottom side of the bridge to prevent injury and further promote access to the operating center.

The improved bridge of the present invention employs an off center lifting mechanism allowing the raising or lowering of the bridge by a single person exerting no more than a normal hand pressure.

Therefore it is the primary object of the present invention to provide a bridge in combination with a remote pallet set-up system for transferring pallets with a means of removing the bridge from the transfer point allowing full access to the transfer point.

Yet another object of the present invention is to provide a means for raising and lowering of the bridge by a hand pressure.

Yet still another object of the present invention is to provide a means for adjusting the improved bridge to create a level plane of transfer regardless of the unevenness of the floor support surface.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

As required, detailed embodiments of the present invention are disclosed herein, however, it is to be understood that the disclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Figure 1:
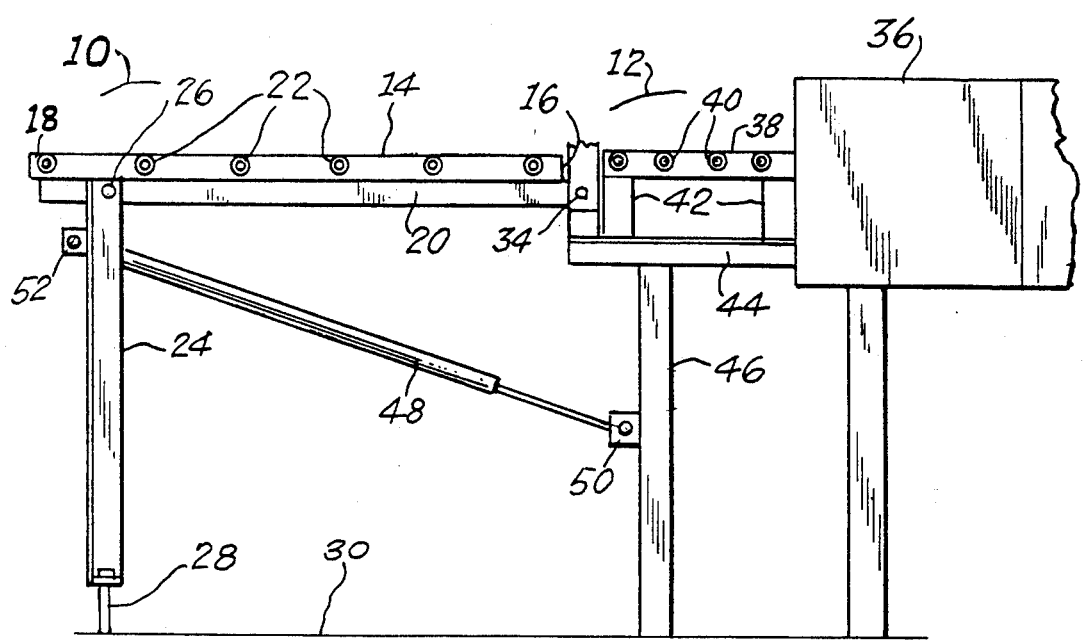
FIG. 1 is a perspective view of the improved bridge of the instant invention illustrated in the open position.

Now referring to FIG. 1, an improved bridge is shown comprising two sections, main frame 10 shown in a horizontal form and fixed section 12. Movable roller track 14 extends from coupling end 16 to extension end 18, the length there between conforming to the distance between a set-up table and machine or made adjustable thereto, the roller track 14 is releasably secured to transverse support member 20. Roller track 14 employs a plurality of roller bushings 22 between ends 16 and 18 allowing for the slidable movement of a pallet thereon. Extension end 18 is supported by hingedly mounted collapsible vertical stand member 24 coupled to support member 20 by bolt 26. Stand member 24 is made adjustable in height by clockwise or counterclockwise rotation of adjustment bolt 28 for variation of distance between support member 20 and the floor 30. The movable roller track is hingedly mounted to fixed section 12 by support bolt 34. Fixed section 12 is coupled, as an addition, to existing remote set-up station 36 wherein continuation of roller track 14 is performed by fixed roller track 38 having a plurality of roller bushings 40 supported by posts 42 above transverse support member 44 further supported by stand member 46. It should be noted that fixed section 12 can be eliminated by design of a remote set-up station having the functionality of the fixed section namely, incorporating a means for coupling the movable track 14 to the remote set-up station, and means for attaching a hydraulic dampener 48. Dampener 48 is hingedly mounted to stand member 46 by bracket 50 and vertical stand member 52.

Figure 2:
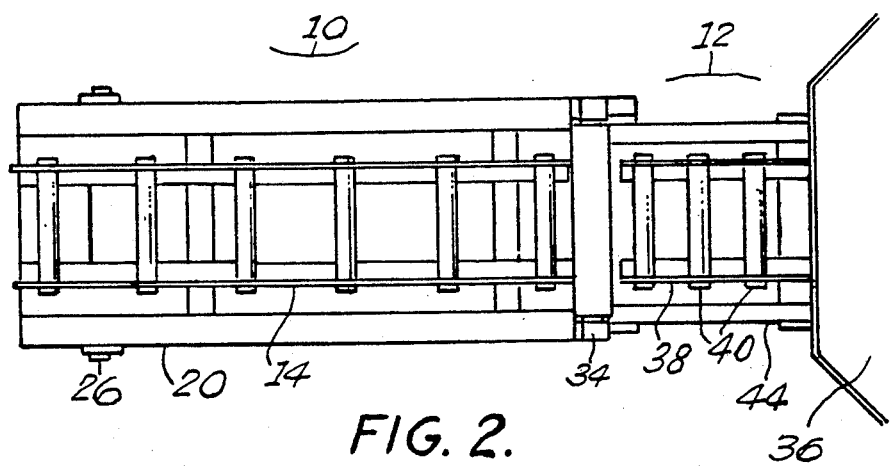
FIG. 2 is a top view of the bridge.

Now referring to FIG. 2, a top view of the improved bridge is shown illustrating main frame 10 and fixed section 12. Movable roller track 14 is shown releasably secured to support member 20. Roller track 14 employs a plurality of roller bushings 22 mounted perpendicular to support member 20. As illustrated, the roller track 14 is shown placed on top of a support member 20. The configuration permits a change of track size to accommodate a variety of pallet sizes. It should be noted that the roller track 14 and support member 20 can be one and the same without defeating the object of the invention. Support member 20 is hingedly mounted to fixed section 12 by hinge bolt 34. Fixed section 12 is further coupled to set-up station 36 wherein continuation of roller track 14 is performed by fixed roller track 38 having a plurality of roller bushings 40 support by posts 42 above transverse support member 44 supported by stand member 46.

Figure 3:
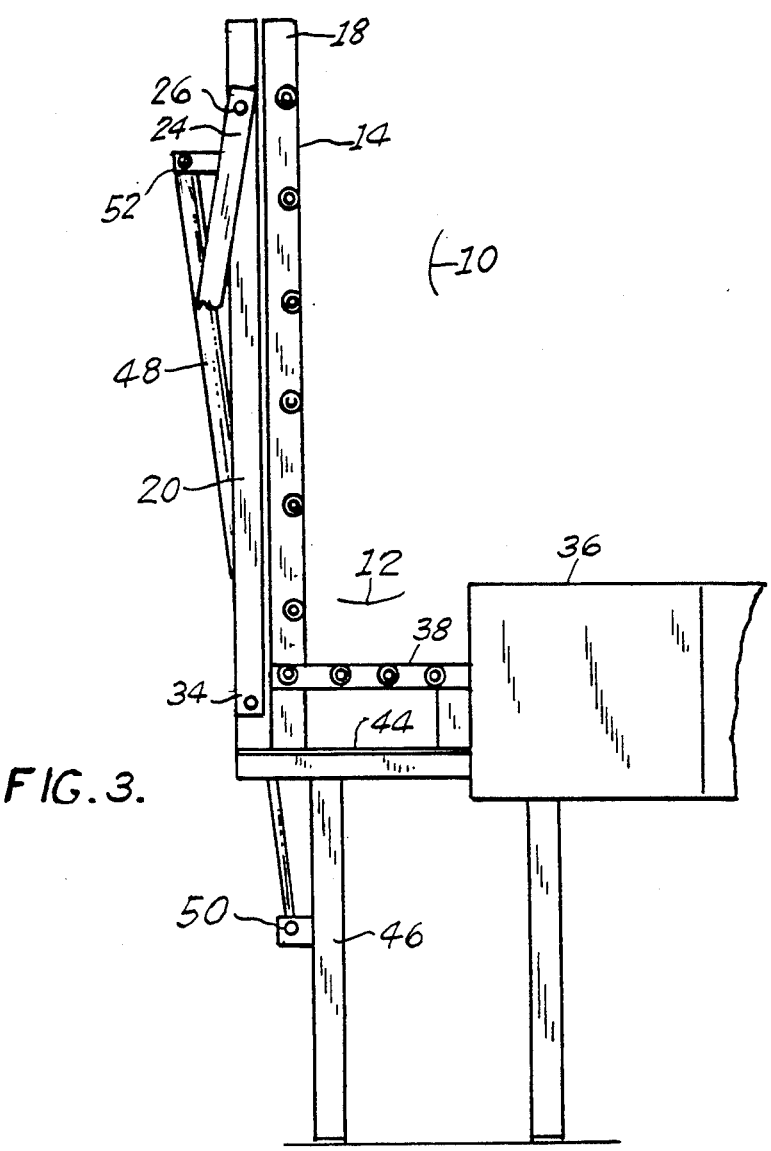
FIG. 3 is a perspective view of the improved bridge of the instant invention illustrated in the closed position.

Now referring to FIG. 3, the improved bridge allows the operator to lift the bridge away from the front of the machining center by lifting extension end 18 to a position that will not interfere with the access to the machine. By lifting extension end 18, main frame section 10 is articulated around support bolt 34 until placed into a vertical form with roller track 14 and support member 20 at a right angle to fixed base 44. The lifting process is possible with minimal effort by use of hydraulic dampener 48 in combination with extended pulling bracket 52. Pulling bracket 52 is coupled to stand support member 24 causing stand member 24 to collapse by articulation of bolt 26 and remain juxtaposed to transverse support member 20. Access is now possible to the machine for tool changing, service, pallet alignment, cleaning, oiling, adjusting, supervising, and so forth, without interference by the bridge. It is to be understood that while I have illustrated and described a certain form of my invention, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What I claim as new and desire to secure by Letters Patent of the United States is:

1. A bridge for use in combination with a remote set-up station for transporting pallets between the remote set-up station and a machining center comprising:
   a main frame defined as a pair of elongated guide tracks having a support end and an extension end and an upper surface and a lower surface, said support end pivotedly mounted to a remote set-up station, said extension end movable between an operating position horizontal to said support end and a storing position vertical to said support end;
   means for slidable transport of pallets over said guide tracks;
   a collapsible stand coupled to said main frame, said stand opening to a perpendicular position in relation to said main frame providing a main frame support directly to the floor, said stand collapsing to a parallel position in relation to said main frame when said main frame is placed in a vertical position; and
   a dampener operatively associated with said collapsible stand allowing ease of placement of said main frame in said vertical position.

2. The bridge for transporting pallets between a remote set-up station and a machining center according to claim 1 wherein said guide tracks are spaced in parallel relation to one another at a predetermined distance to accommodate conventional machining pallets.

3. The bridge for transporting pallets between a remote set-up station and a machining center according to claim 1 wherein said transporting means is defined as a plurality of roller bushings mounted to said guide tracks, said roller bushings located outboard said guide tracks.

4. The bridge for transporting pallets between a remote set-up station and a machining center according to claim 3 wherein said roller bushings are disposed for slidable engagement with the C-shaped roller securement portion of conventional pallets.

5. The bridge for transporting pallets between a remote set-up station and a machining center according to claim 3 further comprising a means for laterally displacing said guide track in aligning said guide tracks with guide tracks located on said remote set-up station and guide tracks located on said machining center allowing a continuous track between the two locations.

6. The bridge for transporting pallets between a remote set-up station and a machining center according to claim 1 wherein said collapsible stand further comprises a means for adjusting the elevation of the extension end of said main support in relation to the ground, said means for adjusting located at the base of said collapsible stand.

7. The bridge for transporting pallets between a remote set-up station and a machining center according to claim 6 wherein said collapsible stand includes a vertical stand member operatively associated with said damper, said vertical stand member placed at a predetermined location on said stand whereby placing said main frame in a vertical position causes said dampener to over extend it's operating range in conjunction with said vertical stand member causing said collapsible stand to fold against the bottom surface of said main frame.

8. The bridge for transporting pallets between a remote set-up station and a machining center according to claim 1 further comprising a secondary frame defined as a pair of elongated guide tracks having a first end and a second end, said guide tracks permanently mounted to said remote set-up station, said first end coupled to said pivotal means of said support end of said main frame, said second end coupling to a conventional guide track disposed within said remote set-up station.

9. The bridge for transporting pallets between a remote set-up station and a machining center according to claim 8 wherein said secondary frame provides a means for attaching a dampener to said secondary frame for coupling to said collapsible stand.

* * * * *